United States Patent [19]
Arledge et al.

[11] Patent Number: 5,437,941
[45] Date of Patent: Aug. 1, 1995

[54] THIN FILM ELECTRICAL ENERGY STORAGE DEVICE

[75] Inventors: John K. Arledge, Lauderhill; James L. Davis, Coral Springs; Thomas J. Swirbel, Davie, all of Fla.

[73] Assignee: Motorola, Inc., Schaumburg, Ill.

[21] Appl. No.: 373,903

[22] Filed: Jan. 17, 1995

Related U.S. Application Data

[63] Continuation-in-part of Ser. No. 125,717, Sep. 24, 1993, abandoned.

[51] Int. Cl.[6] .................. H01M 2/14; H01M 2/18
[52] U.S. Cl. ..................... 429/129; 429/130; 429/142; 429/146
[58] Field of Search ............ 429/129, 130, 142, 146

[56] References Cited

U.S. PATENT DOCUMENTS

| | | | |
|---|---|---|---|
| 1,200,345 | 10/1916 | Hardy et al. | 429/130 |
| 2,428,470 | 10/1947 | Powers | 429/129 |
| 3,909,930 | 10/1975 | Gurtler | 29/592 |
| 4,158,085 | 6/1979 | Bilhorn | 429/130 |
| 4,315,976 | 2/1982 | Conte | 429/194 |
| 4,690,510 | 9/1987 | Takamatsu et al. | 350/334 |
| 4,705,360 | 11/1987 | Funada et al. | 350/344 |
| 5,116,701 | 5/1992 | Kalisz | 429/130 |

FOREIGN PATENT DOCUMENTS

| | | | |
|---|---|---|---|
| 2335369 | 2/1975 | Germany | 429/129 |
| 172660 | 10/1982 | Japan . | |
| 6610265 | 1/1967 | Netherlands | 429/130 |
| 670066 | 4/1952 | United Kingdom | 429/136 |

*Primary Examiner*—Wayne Langel
*Attorney, Agent, or Firm*—Dale W. Dorinski

[57] ABSTRACT

An electrical energy storage device (10). An electrode (12) consisting of a thin film of metal or metal oxide is deposited on a substrate (24), preferably by sputtering. Spherical plastic spacers (16) are uniformly dispersed on the electrode at a maximum density of about 1000 spacers per square millimeter of the electrode area. A second substrate also has an electrode (14) formed of a thin film of metal or metal oxide deposited on it, similar to the first substrate. The first and second substrates are arranged so that the electrodes face each other and are separated by the spherical plastic spacers to form a gap (18) of about 20 microns between the electrodes. An electrolyte (20) is filled in the gap, and the edges of the gap are optionally sealed (22) to form the electrical energy storage device. The device may also be formed by using metal foils, and eliminating one or more of the substrates. In both cases, the use of an electrolyte is optional.

11 Claims, 2 Drawing Sheets

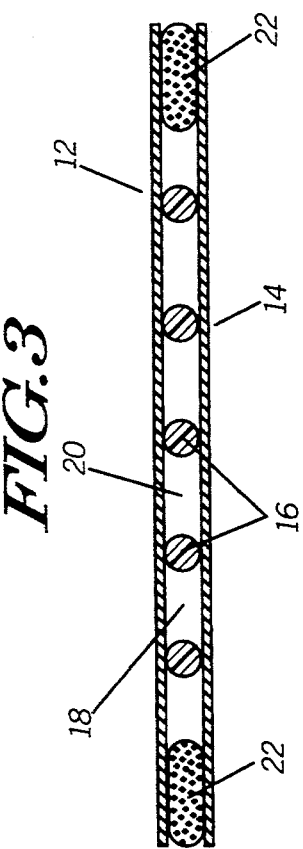
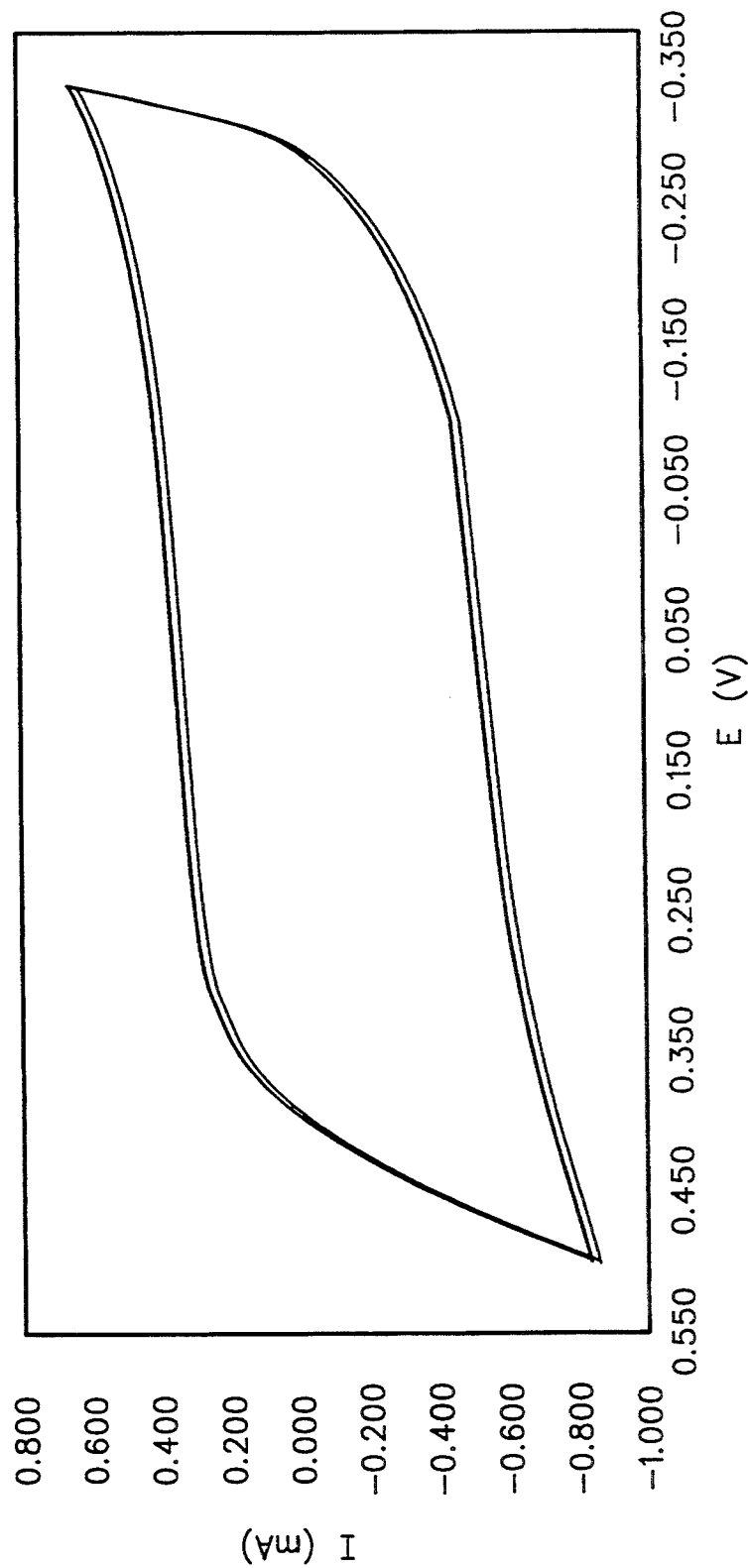

THIN FILM ELECTRICAL ENERGY STORAGE DEVICE

This is a continuation-in-part of application Ser. No. 08/125,717, filed Sep. 24, 1993, and now abandoned.

TECHNICAL FIELD

This invention relates in general to electrical energy storage devices, and more particularly to capacitors or electrochemical cells.

BACKGROUND

The history of electrochemical energy storage devices, especially capacitors and batteries, has involved attempts to reduce package size while increasing the electrical energy storage capacity. Recent advances in battery and capacitor design have increased life, efficiency and energy density. However, although many of the devices embracing the recent technological advances have filled a need, there continues to be a requirement for efficient, high power density electrical storage devices which withstand the rigors of continuous use and virtually unlimited cycling.

Both capacitors and batteries store energy by the separation of positive and negative charges. The need to store greater amounts of energy in a smaller package continues to drive new research into complex and esoteric ways of making storage devices. The result is that many batteries and capacitors have become expensive and complicated, requiring sophisticated charging schemes and fabrication methods. For example, pseudocapacitors require electrodes made from expensive rare earth materials, and some capacitors and batteries utilize toxic or hazardous chemicals to achieve high charge density. Clearly, a need exists for an electrical energy storage device that combines the desirable features of conventional electrochemical batteries and conventional capacitors, yet can store much larger amounts of energy in a smaller package and can be manufactured at a reasonable cost.

SUMMARY OF THE INVENTION

Briefly, according to the invention, there is provided an electrical energy storage device. An electrode consisting of a thin film of metal or metal oxide is deposited on a substrate, preferably by sputtering. Spacers are uniformly dispersed on the electrode at a maximum density of about 1000 spacers per square millimeter of the electrode area. A second substrate also has a thin film of metal or metal oxide deposited on it, similar to the first substrate. The first and second substrates are arranged so that the electrodes face each other and are separated by the spacers to form a gap of about 20 microns between the electrodes. An electrolyte is filled in the gap, and the edges of the gap are optionally sealed to form the electrical energy storage device.

In an alternate embodiment, the device is formed by using metal foils, and eliminating one or more of the substrates. In both cases, the use of an electrolyte is optional.

BRIEF DESCRIPTION OF THE DRAWINGS

FIG. 3 is a cross-sectional view of an alternate embodiment of an electrical energy storage device in accordance with the invention.

FIG. 4 is a cyclic voltammetry graph of a device made in accordance with the invention.

DETAILED DESCRIPTION OF THE PREFERRED EMBODIMENT

Figure 1:
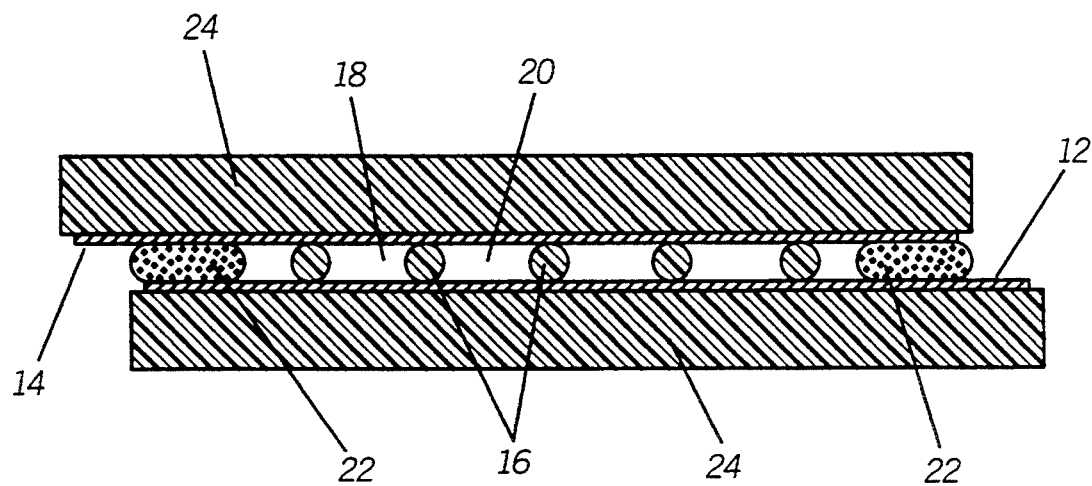
FIG. 1 is a cross-sectional view of an electrical energy storage device in accordance with the invention.

While the specification concludes with claims defining the features of the invention that are regarded as novel, it is believed that the invention will be better understood from a consideration of the following description in conjunction with the drawing Figures, in which like reference numerals are carried forward. For sake of clarity, some features of the drawings are exaggerated and intentionally not drawn to scale. Referring now to FIG. 1, there is generally depicted a thin film electrical energy storage device 10 consisting of two substrates 24 which are each coated on one side with an electrode material to form a first electrode 12 and a second electrode 14. The two electrodes are positioned face to face with a small uniform gap 18 between them. This gap 18 is defined and maintained by microscopic spacers 16 composed of particles of electrically non-conductive material dispersed randomly between the substrates. The electrodes and substrates are held together by an epoxy seal 22 which completely surrounds the central area as illustrated in both FIG. 1 and FIG. 2. This assembly forms a cavity which may be optionally filled with an appropriate electrolyte 20. The result is a small energy storage device with a capability to store large amounts of electrical energy.

To build such a device one can start with two substrates. These substrates may be composed of various materials such as ceramic, glass, plastic, or metal. Preferably the substrates would be thin, flat, relatively stiff, and have a planar face. The substrate could be nonconductive, but in the case where the substrate is conductive it could also function as a current collector. A thin film of electrode material would be applied to the face of a substrate. For some devices, the same electrode material would be applied to each substrate; for other devices, the opposing electrodes might be composed of different materials. Materials that can serve as electrodes include metals, metal oxides, and organometallic compounds. The electrode material would be applied to the substrate using one or more of the many standard deposition techniques such as sputtering, evaporation, lamination, plating, chemical vapor deposition, or plasma spraying.

In the preferred embodiment, the electrodes are between 0 and about 10,000 Angstroms thick. This is the range of coating thickness that is known to those skilled in the art as a "thin film" and, as such, is also know as "thin film technology". For example, thin films of indium-tin oxide are commonly used to manufacture liquid crystal displays, and these films range between 1,000–10,000 Angstroms. Hybrid microelectronic circuits are made by vacuum depositing thin films of copper, tungsten, rhenium, rhodium chrome, gold, aluminum, titanium, nickel and their oxides in the range of 100–15,000 Angstroms. However, in some instances the user may wish to deposit a somewhat heavier film of metal or metal oxide, and films up to about 30,000 Angstroms have been considered to be "thin film". Most preferentially, the film will be between 1000 and 3000 Angstroms thick. The electrode may be patterned by a number of conventional means, including photolithography, masking, etching, etc.

The next step is to assemble the two substrates together. To accomplish this task, a narrow bead of a suitable adhesive such as an epoxy would be applied to the first substrate 24. This might be accomplished by screen printing, dispensing by hand using a syringe, or by automated equipment. One or more small openings or ports 26 are left at strategic locations in the perimeter seal 22 to form one or more fill ports to facilitate introduction of the electrolyte 20 in a later step. Another step in preparing for assembly is to apply the spacers 16, preferably to the second substrate 24. The spacers 16 are typically glass spheres, chopped glass fibers, plastic spheres, chopped plastic fibers, ceramic spheres, chopped ceramic fibers, or polystyrene/divinylbenzene spheres. The diameter of the spacers is selected and controlled so that they will provide a uniform gap 18, typically less than 20 microns, between the two electrodes in the final assembled state. The spacers are applied by any of several methods, such as dry cloud chamber spraying, solvent dispersal and spraying, solvent dispersal and spincoating, or dry electrostatic spraying, so that the final spacer density is less than 1000 spacers per square millimeter covering less than 10 percent of the electrode area. Preferably, the spacer density would be minimized to achieve the lowest percent of electrode coverage while maintaining sufficient electrical isolation of the electrodes.

Figure 2:
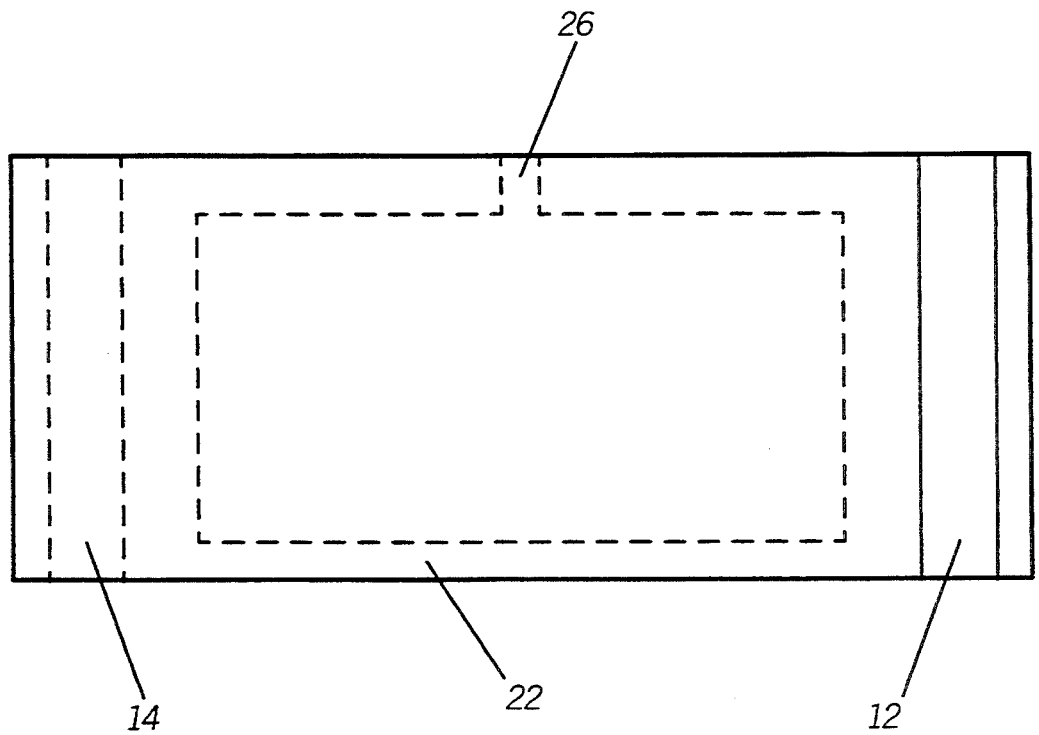
FIG. 2 is a plan view of an electrical energy storage device in accordance with the invention.

After the epoxy and spacers 16 have been applied, the substrates are turned face to face so that the electrodes are facing each other. The substrates are so arranged that at least a portion of the electrode material on each substrate is exposed, in order to leave room for later electrical connection to each electrode 12 and 14. Referring to FIGS. 1 and 2, it can be seen that the substrates are staggered a bit so that one portion of the electrode 12 is revealed on each substrate. They are then pressed together and the epoxy is cured. Pressing is accomplished by using air bladders or hydraulics, by applying a dead weight, or by enclosing the assembly in an evacuated air tight bag. Typical conditions are 1 atmosphere of pressure at 150° C. to cure the adhesive. As the adhesive flows, the pressure pushes the two electrodes closer together until they stop when the gap 18 is defined by the diameter of the spacers 16. The adhesive cures and holds the electrodes together, maintaining the gap at this point. After curing, the pressure is removed.

Once the assembly has cooled, the electrolyte 20 is introduced into the gap 18 that has been formed between the electrodes. The electrolyte 20 is typically a liquid made of an ion conducting species solvated in an aqueous or organic medium. To fill the device, the cell is first evacuated by placing it in a vacuum chamber and pumping out most of the air. After the air has been removed from the cell, the electrolyte 20 is applied to the edge of the device at the point where the opening, or fill port 26, was left in the perimeter seal 22. Due to the small size of the gap, capillary forces will draw the liquid electrolyte into the cell through the fill port 26, filling the cavity bounded by the electrodes and the perimeter seal. Once the cell is filled, the vacuum chamber can be vented and the cell can be removed from the chamber. Capillary forces will hold the electrolyte in place temporarily while the fill port 26 is plugged with a compatible adhesive such as an epoxy, a hot melt, or ultraviolet (UV) curable material. The plug material is then cured or allowed to free cure, and the cell is ready to be tested and used. Alternative fill methods could also be used. For example, a vacuum could be drawn at one port while the electrolyte 20 is introduced at a second port in such a fashion that the cell is filled with the electrolyte. In a case where vacuum is not available or not compatible with the materials or electrolyte used, two ports on diagonally opposite corners of the cell might be used. The cell would be oriented with the diagonally opposite ports on a vertical line. The port 26 on the lower corner would then be immersed in the electrolyte. Capillary forces would draw the liquid up into the cell forcing the air out of the port 26 at the top corner. After filling, the ports are sealed in the manner previously described.

An alternative embodiment is possible in which the substrate 24 is eliminated. In this case, the electrodes may be foil materials that would be treated as if they were substrates coated with metal. The spacers 16 and epoxy would be applied directly to the foils and two foils would be glued together at the perimeter to form a cell in the same manner as previously described. The cell would be filled with an electrolyte 20 and used in the same manner as the previously described embodiment. The advantages to this approach include elimination of the substrates and the metallization step, with the realization of smaller device thickness.

The following examples will serve to better illustrate the invention and its potential.

EXAMPLE 1

The first sample was fabricated by sputtering two small sheets of glass plate with about 750 angstroms of metallic tungsten. An epoxy seal was applied to the perimeter of the first sputtered substrate except for two fill port areas. The second substrate was placed on the center of a precision turntable and spun at 2000 revolutions per minute (RPM). Previously, 80 milligrams of polystyrene/divinylbenzene spheres 10 microns in diameter had been ultrasonically dispersed in 100 milliliters of isopropyl alcohol to form an admixture. As the second substrate was spinning at 2000 RPM a generous quantity of the admixture was dispensed in the center of the substrate. As it spun, the excess material was thrown off and the alcohol evaporated leaving a dry, uniform layer of spheres at a density of about 50 spheres per square millimeter. The two substrates were then pressed face to face at approximately 15 pounds per square inch and the epoxy was cured at 150° C. for one hour. After curing, a solution of 0.1 molar sulfuric acid was introduced to one fill port and allowed to sit for several minutes during which time it filled most of the cell forcing the air out of the other port. An ultraviolet curable adhesive was applied to the fill ports and cured under a high intensity UV light. The cell was then tested and found to exhibit electrical energy storage capability analogous to a capacitor.

EXAMPLE 2

A second set of cells was fabricated and tested. The substrate was glass plate. In this case the electrodes were formed by first sputtering about 1500 angstroms of titanium and then sputtering about 750 angstroms of tungsten over the titanium. The admixture of spacers dispersed in alcohol described in Example 1 was used in this example. The spacers were applied to the panels using the same spinning method. The two substrates were assembled with the electrodes face to face, and held together with a clamp. The clamp applied continuous pressure to maintain the gap at 10 microns as defined by the spacer diameter. The total area of the plane between the two electrodes in the cell thus formed was approximately 20 square centimeters. Test leads were attached to each of the two electrodes and the edge of the substrates was dipped into an electrolyte. The cell was allowed to fill for 5 minutes by capillary action, and then electrically tested. The cell edge was kept in the electrolyte reservoir during the test since the edges were not sealed.

Testing consisted of cyclic voltammetry, chronoamperometry, and chronopotentiometry. Electrolytes used included aqueous solutions of sulfuric acid, perchloric acid, potassium hydroxide, and sodium carbonate. The test results are listed in Table 1. An example of a typical cyclic voltammetry graph obtained is included as FIG. 4. As illustrated in the table, capacitances as high as 150 milliFarads were achieved with these test cells.

TABLE 1

Performance of Capacitors with Various Electrolytes

| Electrolyte | No. Cycles[1] | Max. Current[2] mAmperes | Stored Charge mCoulombs | Capacitance mFarads |
|---|---|---|---|---|
| None | — | $2 \times 10^{-6}$ | | 1–2 nanoFarads |
| 0.1M $H_2SO_4$ | 1200 | 2.0 | 120 | 150 |
| 0.1M $H_2ClO_4$ | 1300 | 2.1 | 32 | 40 |
| 0.2M $NaCO_3$ | 3000 | 0.85 | 18 | 22 |
| 0.1M KOH | 1000 | no capacitance observed | | |

[1]Refers to the number of cycles performed in cyclic voltammetry experiments when testing was terminated. No cell failures were observed for any electrolyte.
[2]Refers to the maximum anodic current in cyclic voltammetry experiments using a sweep rate of 50 mV/sec. Changing the sweep rate will change the maximum current, but will not change the stored charge.

While the behavior exhibited with these examples is capacitive in nature, by employing different electrode materials, an electrochemical cell, such as a battery can be created. Variations in the electrode materials, for example by using rare earth metal oxides such as oxides of ruthenium, tantalum, rhodium, iridium, cobalt, nickel, molybdenum, tungsten or vanadium can also produce very small capacitors that exhibit a pseudocapacitive nature. Electrodes using carbon can also form double layer capacitance, thereby increasing the capacitance.

In summary, thin film electrodes deposited on dielectric substrates that are held in close proximity have the capability of producing devices that have very high capacitance per unit volume. By adding various electrolytes, the capacitance can be substantially increased, and by modifying the electrode materials, even higher capacitance can be obtained. This provides a substantial competitive advantage over the conventional art by creating an energy storage device that can store more energy in a smaller, less complex package than other technologies.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrical energy storage device, comprising:
    first and second substrates, each having a planar face;
    first and second electrodes consisting of a thin film of metal or metal oxide deposited on said respective substrate planar faces, the thin film being less than 10,000 Angstroms thick;
    spacers, comprising particles of electrically non-conductive material disposed between the first and second electrodes;
    the first and second electrodes arranged so that the spacers form a uniform gap of less than 20 microns between the electrodes, and the spacers cover less than 10% of the area of either electrode;
    an electrolyte disposed in the gap between the electrodes; and
    sealing means disposed between the first and second electrodes to seal the gap.

2. The electrical energy storage device of claim 1, wherein the electrolyte is an ion conducting species solvated in an aqueous or organic medium.

3. The electrical energy storage device of claim 1, wherein the first and second electrodes are different materials.

4. The electrical energy storage device of claim 1, wherein the substrates are selected from the group consisting of ceramic, plastic, glass and metal.

5. The electrical energy storage device of claim 1, wherein the substrates serve as a current collector.

6. The electrical energy storage device of claim 1, wherein the spacers are selected from the group consisting of glass spheres, chopped glass fibers, plastic spheres, chopped plastic fibers, ceramic, and polystyrene/divinylbenzene spheres.

7. An electrical energy storage device, comprising:
    a first substrate having a planar face;
    a first electrode consisting of a thin film of metal or metal oxide less than 10,000 Angstroms thick deposited on the face of the first substrate;
    spherical plastic spacers uniformly dispersed on the first electrode at a density of less than about 1000 spacers per square millimeter of the electrode area;
    a second substrate having a planar face;
    a second electrode consisting of a thin film of metal or metal oxide deposited on the face of the second substrate;
    the first and second substrates arranged so that the first and second electrodes face each other and are separated by the spherical plastic spacers, the spacers providing a gap of less than about 20 microns between the electrodes;
    an aqueous electrolyte disposed in the gap; and
    means for sealing the electrolyte in the electrical energy storage device.

8. The electrical energy storage device of claim 7, wherein the first and second electrodes are different materials.

9. The electrical energy storage device of claim 7, wherein the first and second substrates are selected from the group consisting of ceramic, plastic, glass and metal.

10. The electrical energy storage device of claim 7, wherein the substrate serves as a current collector.

11. An electrical energy storage device, comprising:
a first substrate having an electrode comprising a thin film of titanium between about 500 Angstroms and about 2000 Angstroms thick deposited on a planar face of the substrate;
a second substrate having an electrode comprising a thin film of titanium between about 500 Angstroms and about 2000 Angstroms thick deposited on a planar face of the substrate;
the first and second substrates arranged in parallel fashion so that the first electrode is in the proximity of and facing the second electrode;
polystyrene-divinyl benzene spheres disposed between the first and second electrodes forming uniform gap of less than 20 microns between the electrodes, and the spacers covering less than 10% of the area of either electrode;
an electrolyte disposed in the gap between the electrodes; and
sealing means disposed between the first and second substrates to seal the gap.

* * * * *